H. P. MAXIM.
TIRE INFLATER FOR AUTOMOBILES.
APPLICATION FILED JULY 13, 1909.
956,592.
Patented May 3, 1910.
2 SHEETS—SHEET 1.
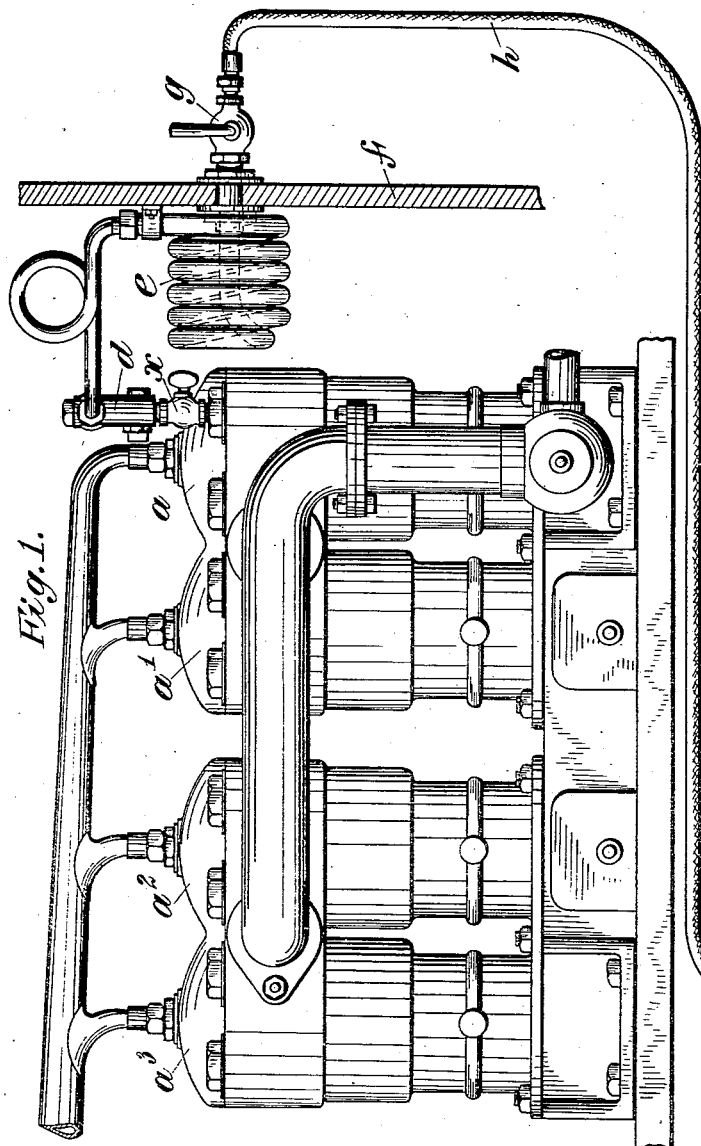
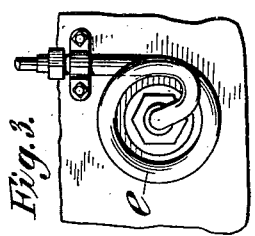
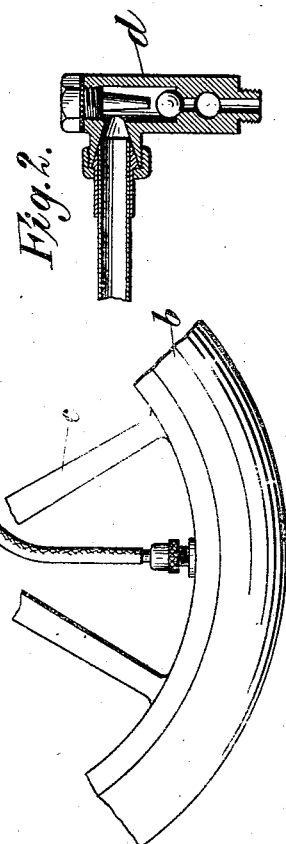
WITNESSES:
INVENTOR
Hiram Percy Maxim
BY
Redding, Greeley & Austin
ATTORNEYS

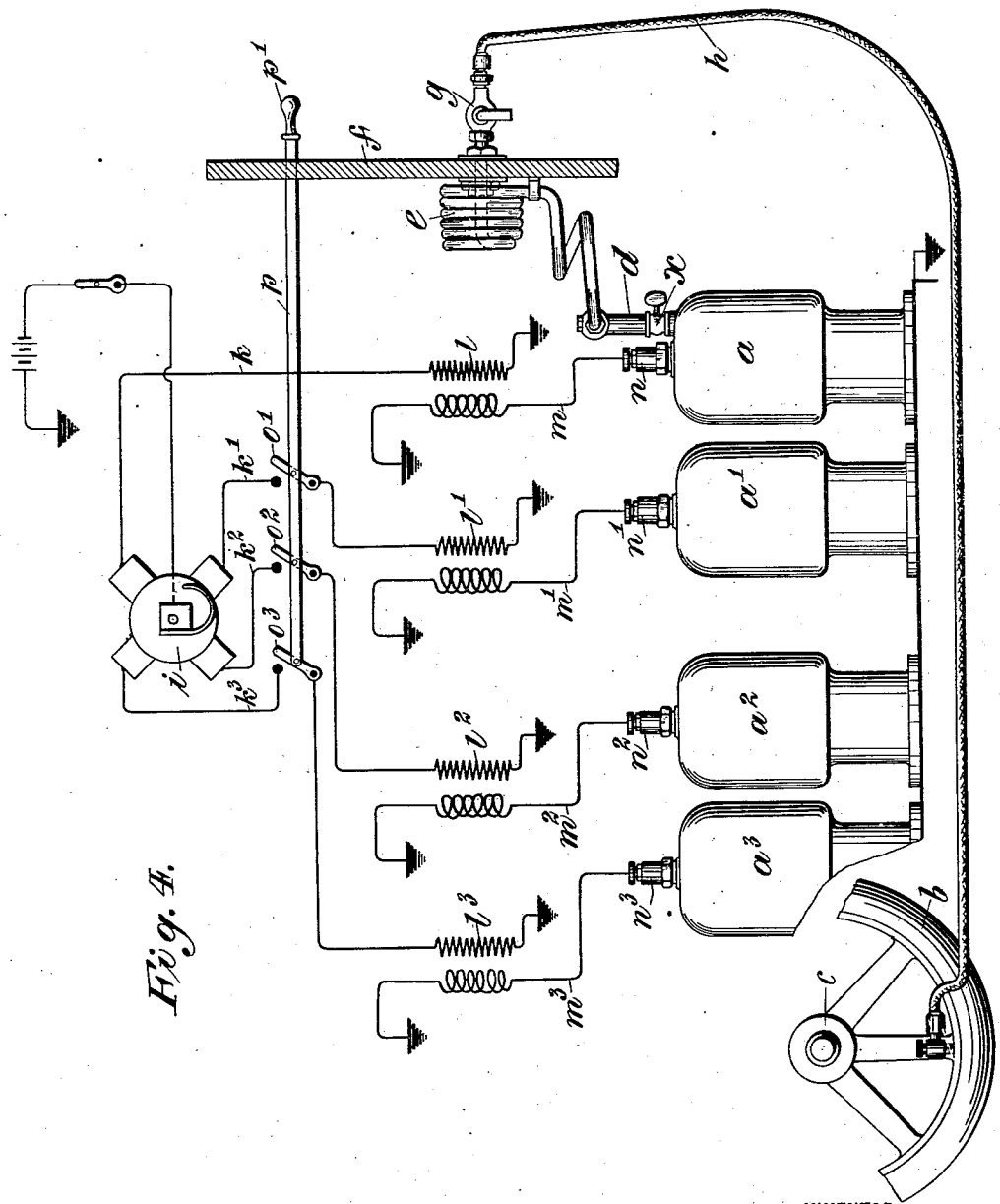

UNITED STATES PATENT OFFICE.

HIRAM PERCY MAXIM, OF HARTFORD, CONNECTICUT.

TIRE-INFLATER FOR AUTOMOBILES.

956,592.  Specification of Letters Patent.  Patented May 3, 1910.

Application filed July 13, 1909. Serial No. 507,432.

*To all whom it may concern:*

Be it known that I, HIRAM PERCY MAXIM, a citizen of the United States, residing in the city of Hartford, in the State of Connecticut, have invented certain new and useful Improvements in Tire - Inflaters for Automobiles, of which the following is a specification, reference being had to the accompanying drawings, forming a part hereof.

It has been proposed heretofore to provide for the inflation of the tires of an automobile by the burned gases, under a greater or less degree of compression, from the explosion cylinders of the internal combustion engine by which the automobile is driven, the gas being cooled and having its pressure equalized between the engine cylinders and the tire. In order that the pressure of the gas so supplied to the tires may be high enough to properly inflate the tires, it is necessary that, during the operation of inflating, the engine shall be running under a load, the pressure developed when the engine is running without a load being insufficient. It is, of course, impracticable to inflate the tires when the automobile is running, and it is also impracticable to operate the engine under a brake when the clutch is open.

It is the object of the present invention to provide means whereby the inflation can be carried on at the requisite pressure while the automobile is standing still and to that end provision is made for utilizing the burned gas from one of the several cylinders of a multiple cylinder engine while ignition in the remaining cylinders of the engine is cut off, so that such remaining cylinders offer the necessary resistance or create the necessary load against which the cylinder in which the explosions continue must operate in order that the burned gases may have the necessary pressure.

The invention will be more fully explained hereinafter with reference to the accompanying drawings in which it is illustrated and in which—

Figure 1 is a view, partly in elevation and partly in section, showing an automobile engine, a portion of one of the automobile wheels with its tire, a portion of the dash, and the connections from one of the cylinders to the tire. Fig. 2 is a detail view of the check valve applied to the cylinder which supplies the gas for inflating. Fig. 3 is a detail end view of the cooling coil which is shown in side elevation in Fig. 1. Fig. 4 is a view, partly in elevation and partly diagrammatic, showing means for cutting out ignition of the cylinders which do not supply gas for inflating.

The engine with which the invention is employed may have two or any greater number of cylinders. That shown in the present drawings has four cylinders $a$, $a'$, $a^2$ and $a^3$, to each of which the explosive mixture may be supplied in any suitable manner, while the force developed in each is applied to the propulsion of the automobile through the crank shaft in any usual or suitable manner. From one of the cylinders, as $a$, the burned gases may be conducted to the tires of the automobile, one of which is shown at $b$, with a portion of the wheel $c$. It will be obvious that the connection between the cylinder and the tire might be accomplished in any convenient manner. As shown, there is connected to the cylinder, preferably through a cut-off valve $x$, a check valve $d$, which may be of any suitable construction, as shown, for example, in Fig. 2, this check valve serving to prevent the return of the gases under pressure from the conduit or reservoir. From the check valve connection is made to a cooling coil $e$, in which the temperature of the gases is sufficiently reduced by radiation before they enter the tire, such coil also serving as a reservoir or pressure equalizing device in which the impulses of the gases, as they issue from the cylinder, are reduced. Such cooling coil and reservoir may be placed in any convenient position on the automobile. As shown, it is secured directly to the dash $f$, the end of the pipe being carried through the dash and fitted with a cut-off valve $g$ from which connection may be established to the tire of any one of the wheels through a suitable flexible hose $h$. The ignition of the charges in the several cylinders may be effected by any suitable devices. As shown a magneto $i$ is connected through branches $k$, $k'$, $k^2$ and $k^3$ with the spark coils $l$, $l'$, $l^2$ and $l^3$, from which connection is made in the usual manner, through branches $m$, $m'$, $m^2$ and $m^3$ to the igniters indicated at $n$, $n'$, $n^2$ and $n^3$. The branch $k$ from the magneto is represented as a continuous branch, it being thereby intended to indicate that ignition is continued in the cylinder $a$ when ignition is cut off or discontinued in all of the remaining cylinders of the engine through suitable cut-out switches $o'$, $o^2$ and $o^3$, which may be operated simultaneously by any suitable means, such as a bar $p$ extended through the dash $f$ and having a handle $p'$.

During the ordinary operation of the engine in propelling the automobile, the switches $o'$, $o^2$ and $o^3$ are closed and ignition takes place in the cylinders $a'$, $a^2$ and $a^3$ as well as in the cylinder $a$, but when the automobile is standing still and it is desired to inflate any of the tires then, the driving clutch being open, ignition in the cylinders $a'$, $a^2$ and $a^3$ is cut off or discontinued through the opening of the switches $o'$, $o^2$ and $o^3$. Ignition goes on in the cylinder $a$ which operates as usual, but under the load or against the resistance created by the movement of the pistons in the cylinders $a'$, $a^2$ and $a^3$ and of the connected parts. Through the creation of such load or resistance, the cylinder $a$ operates under such conditions that the pressure developed therein is sufficiently high to effect the desired inflation.

It will be obvious that details of construction and arrangement may be varied to suit the structure of the particular automobile or the convenience of the manufacturer and the user and that the present invention is not limited to such details.

I claim as my invention:

1. The combination with an internal combustion engine for an automobile having a plurality of cylinders, of means for conducting the burned gases from one of said cylinders to one or another of the tires to inflate the same, and means for cutting out ignition in all of the other cylinders of the engine during inflation.

2. The combination with an internal combustion engine for an automobile having a plurality of cylinders, of means for conducting the burned gases from one of said cylinders to one or another of the tires to inflate the same, means for cutting out ignition in all of the other cylinders of the engine during inflation and means for cooling the gases between the cylinder and the tire.

3. The combination with an internal combustion engine for an automobile having a plurality of cylinders, of means for conducting the burned gases from one of said cylinders to one or another of the tires to inflate the same, means for cutting out ignition in all of the other cylinders of the engine during inflation and means for equalizing the pressure of the gases between the cylinder and the tire.

4. The combination with an internal combustion engine for an automobile having a plurality of cylinders, of means for conducting the burned gases from one of said cylinders to one or another of the tires to inflate the same, means for cutting out ignition in all of the other cylinders of the engine during inflation, and means for cooling the gases between the cylinder and the tire and for equalizing the pressure of the gases between the cylinder and the tire.

5. The combination with an internal combustion engine for an automobile having a plurality of cylinders, of a pipe coil to receive the burned gases from one of said cylinders, means to conduct the gases from said coil to one or another of the tires to inflate the same, and means for cutting out ignition in all of the other cylinders of the engine during inflation.

6. The combination with an internal combustion engine for an automobile having a plurality of cylinders, of a pipe coil to receive the burned gases from one of said cylinders, means to conduct the gases from said coil to one or another of the tires to inflate the same, means for cutting out ignition in all of the other cylinders of the engine during inflation, and a check valve to prevent movement of the gases backward into the cylinder.

7. The combination with an internal combustion engine for an automobile having a plurality of cylinders, of a pipe coil to receive the burned gases from one of said cylinders, means to conduct the gases from said coil to one or another of the tires to inflate the same, means for cutting out ignition in all of the other cylinders of the engine during inflation, and a shut-off valve for the coil.

8. The combination with an internal combustion engine for an automobile having a plurality of cylinders, of a pipe coil to receive the burned gases from one of said cylinders, means to conduct the gases from said coil to one or another of the tires to inflate the same, means for cutting out ignition in all of the other cylinders of the engine during inflation, a check valve to prevent movement of the gases backward into the cylinder, and a shut-off valve for the coil.

This specification signed and witnessed this 21st day of May, A. D. 1909.

HIRAM PERCY MAXIM.

Signed in the presence of—
ELLA J. KRUGER,
AMBROSE L. O'SHEA.